(12) United States Patent
Barry

(10) Patent No.: US 7,014,410 B2
(45) Date of Patent: Mar. 21, 2006

(54) CONTAINER DRIVE-BY TRANSFER AND SYSTEM

(76) Inventor: Leonard D. Barry, 19300 Pennington Dr., Detroit, MI (US) 48221

( * ) Notice: Subject to any disclaimer, the term of this patent is extended or adjusted under 35 U.S.C. 154(b) by 265 days.

(21) Appl. No.: 10/404,768

(22) Filed: Apr. 1, 2003

(65) Prior Publication Data

US 2003/0228209 A1      Dec. 11, 2003

Related U.S. Application Data

(60) Provisional application No. 60/369,195, filed on Apr. 1, 2002, provisional application No. 60/434,630, filed on Dec. 18, 2002.

(51) Int. Cl.
 *B65G 63/02*     (2006.01)
(52) U.S. Cl. .................... 414/337; 414/338
(58) Field of Classification Search ............... 414/333, 414/334, 337, 338, 339, 343, 392; 102/20
 See application file for complete search history.

(56) References Cited

U.S. PATENT DOCUMENTS

| | | | | |
|---|---|---|---|---|
| 1,032,950 A * | 7/1912 | Schelest | ..................... | 104/20 |
| 1,313,091 A | 8/1919 | Lamar | | |
| 1,383,220 A | 6/1921 | Lamar | | |
| 3,028,023 A | 4/1962 | Eckersall | ..................... | 414/343 |
| 3,471,043 A | 10/1969 | Kemp et al. | | |
| 3,548,756 A | 12/1970 | Fujioka | | |
| 3,991,889 A | 11/1976 | Cox | ........................... | 414/339 |
| 4,065,006 A | 12/1977 | Barry | ......................... | 414/334 |
| 4,082,042 A | 4/1978 | Barry | .......................... | 104/18 |
| 4,093,084 A * | 6/1978 | Ringer | ...................... | 414/343 |
| 4,124,129 A | 11/1978 | Barry | | |
| 4,130,208 A | 12/1978 | Barry | | |
| 6,652,214 B1 * | 11/2003 | Barry | ......................... | 414/337 |
| 6,695,561 B1 * | 2/2004 | Barry | ......................... | 414/337 |

FOREIGN PATENT DOCUMENTS

| | | |
|---|---|---|
| CA | 678706 | 1/1964 |
| DE | 27 17 199 A1 | 11/1978 |

* cited by examiner

*Primary Examiner*—Eileen D. Lillis
*Assistant Examiner*—Charles A. Fox
(74) *Attorney, Agent, or Firm*—Gifford, Krass, Groh, Sprinkle, Anderson & Citkowski, P.C.

(57) ABSTRACT

This is a container transfer system including a highway vehicle and container platform on a railway car, dock, or conveyor to transfer containers by driving alongside of the platform. One or more channels are secured obliquely across the truck bed with extensions which reach out over the platform to engage and guide cam rollers or runners added to the bottom of the container within side clearance for parallel transfer and fold in to secure the container to truck. Two sets of channels cross for loading and unloading from either side of the truck driven forward. Clip-on cam rollers and arms that lock onto the container for quick removal fold in with the channels' ends to lock. A push-off arm added to the container or two on the truck turn horizontally to push the container straight onto the platform. Truck bed height, tilt, and location on the truck is adjustable.

16 Claims, 8 Drawing Sheets

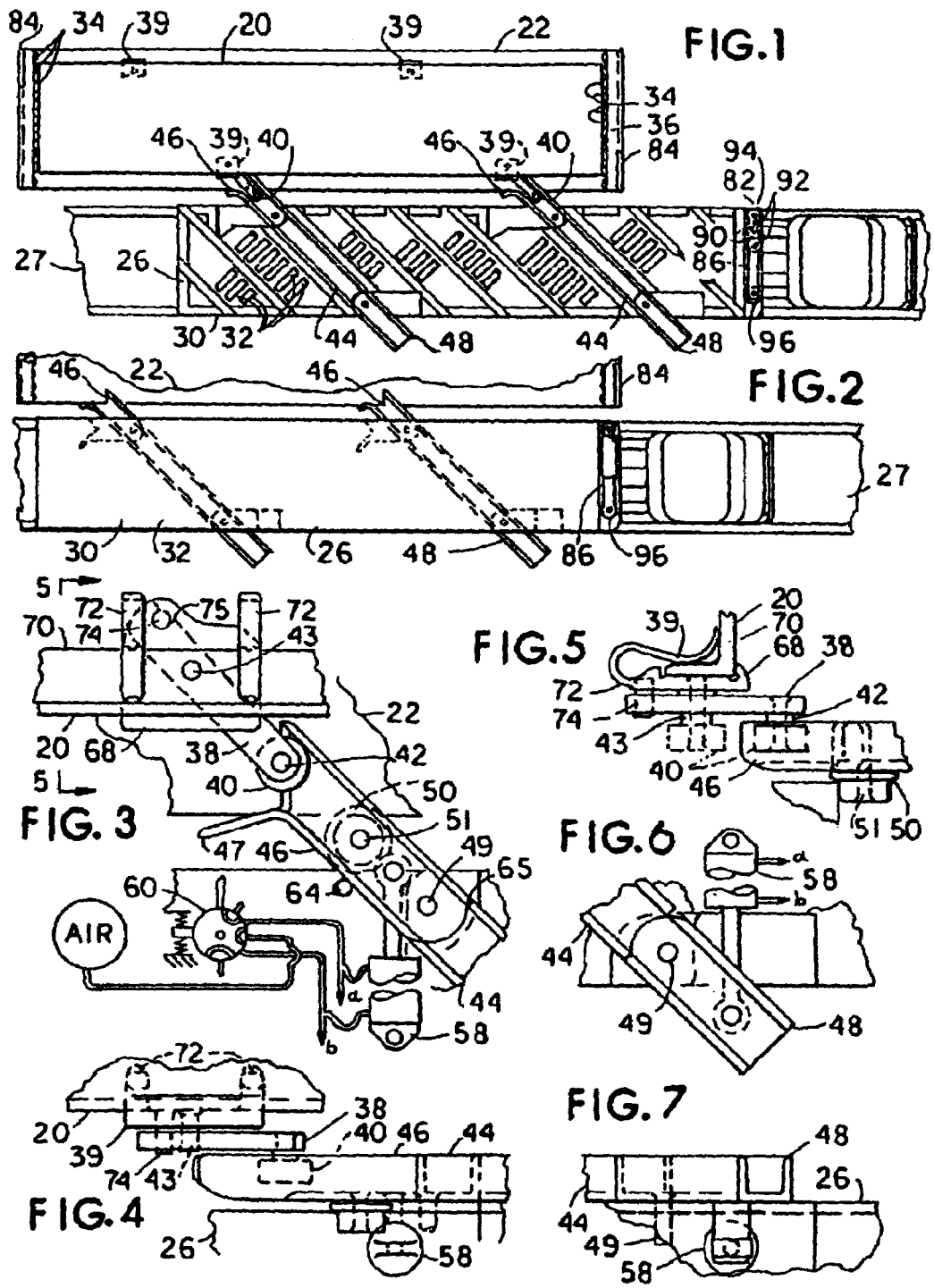

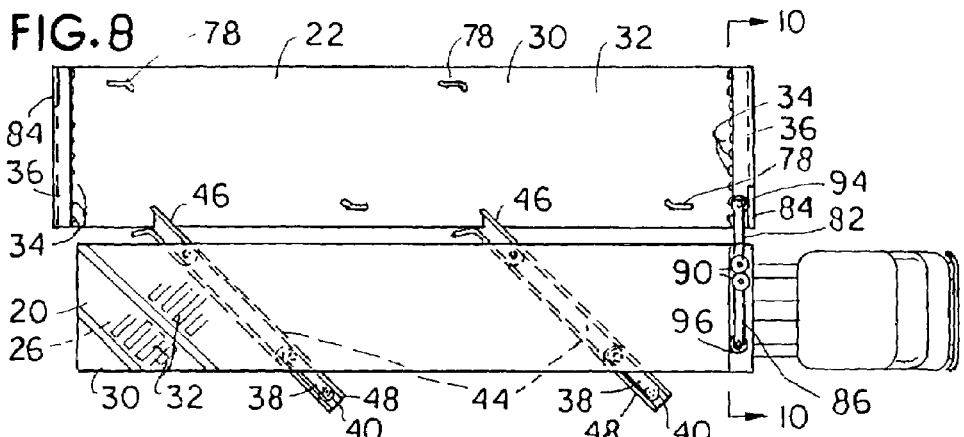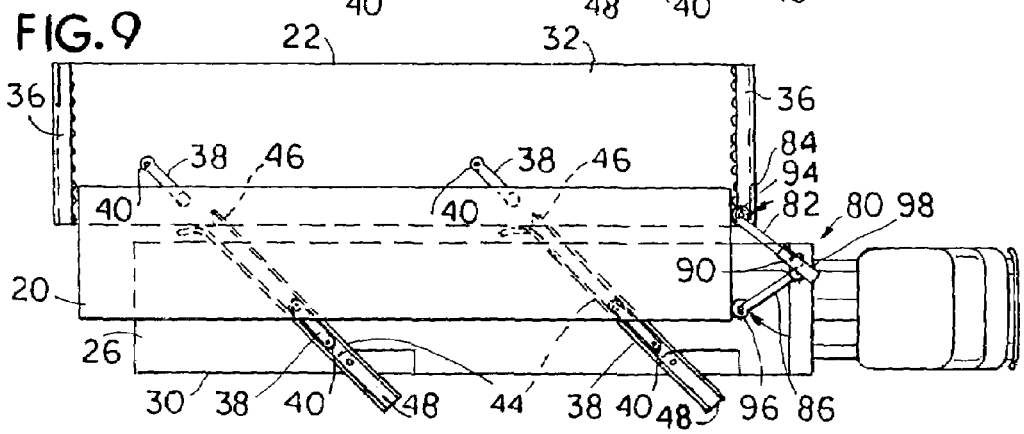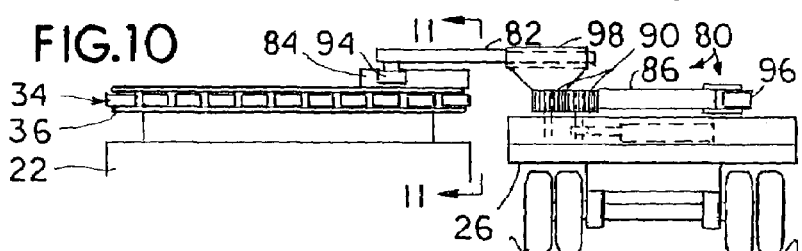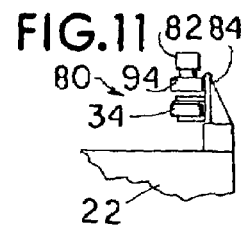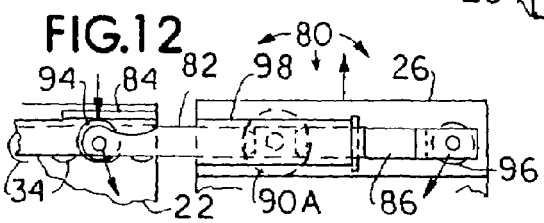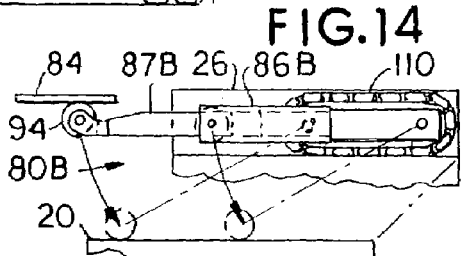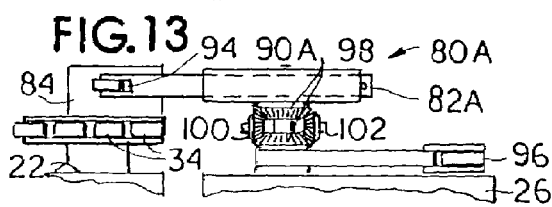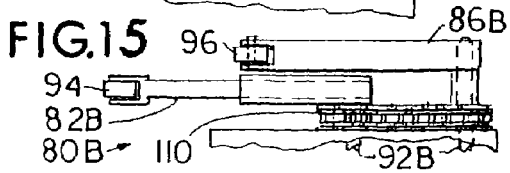

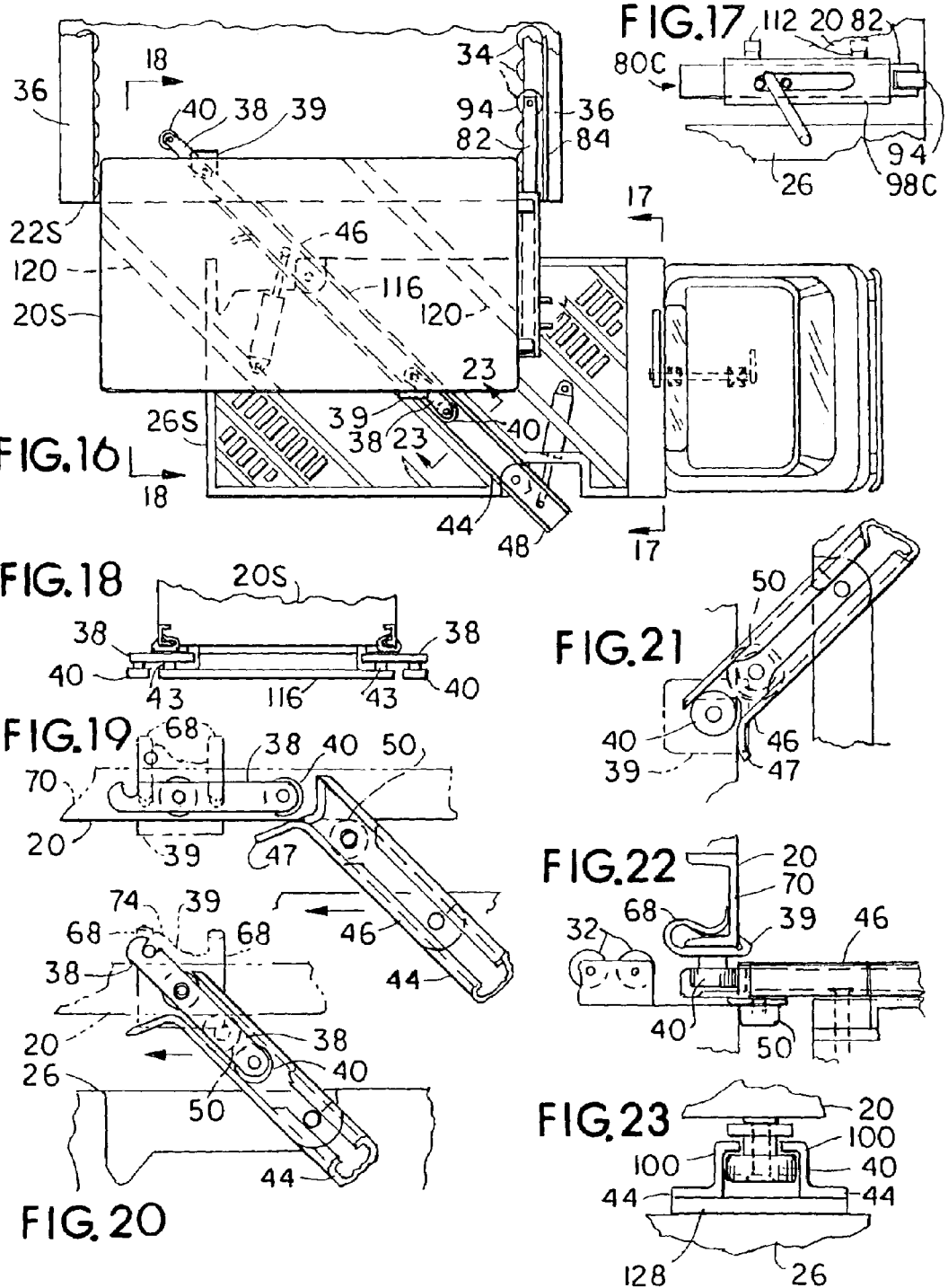

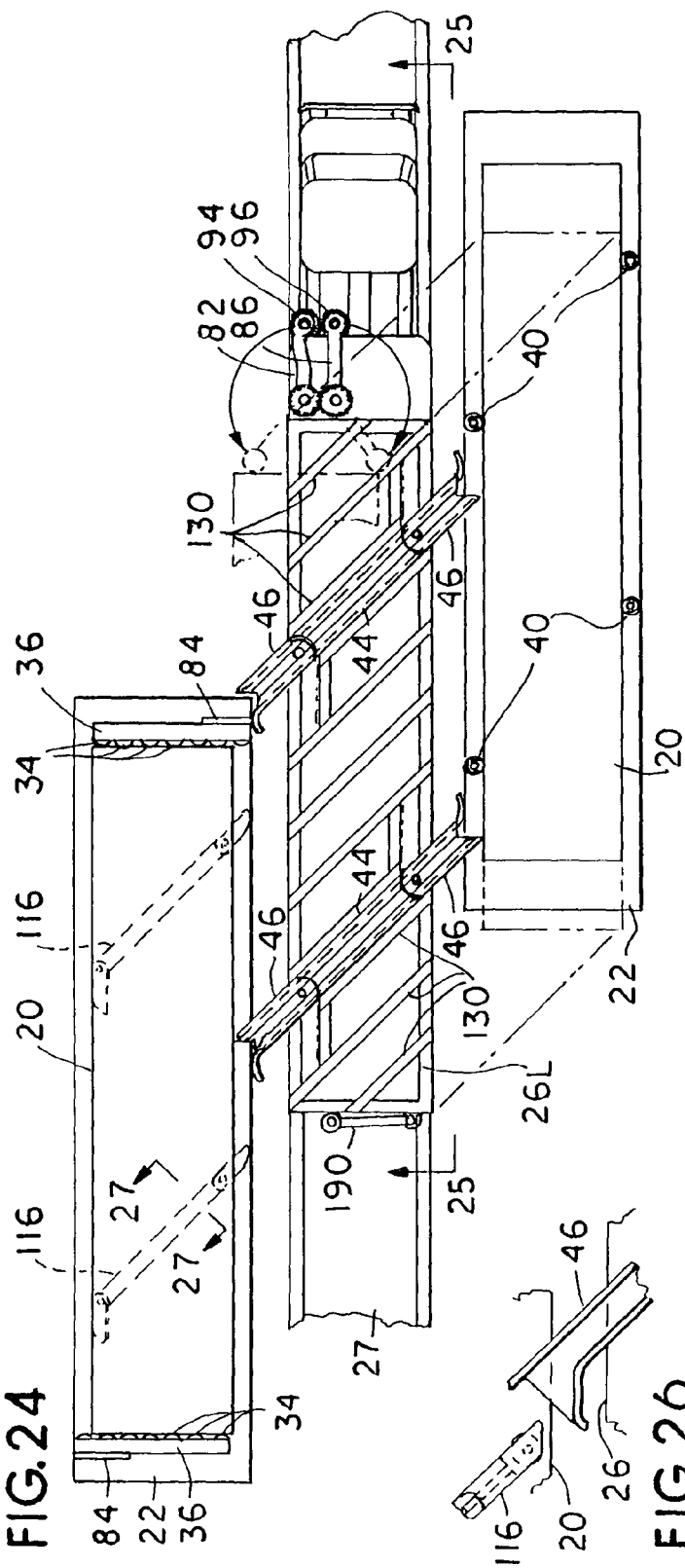
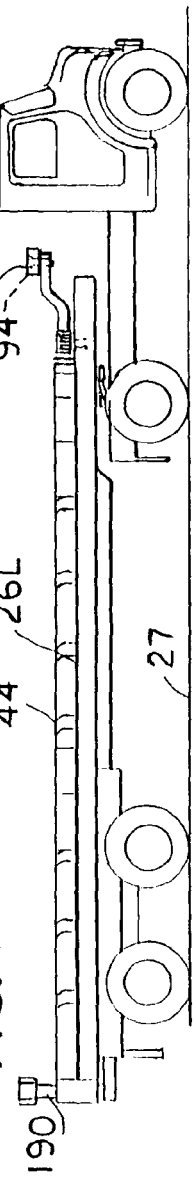
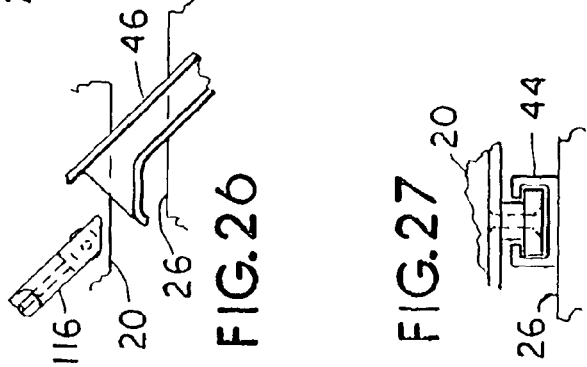
FIG.24
FIG.25
FIG.26
FIG.27

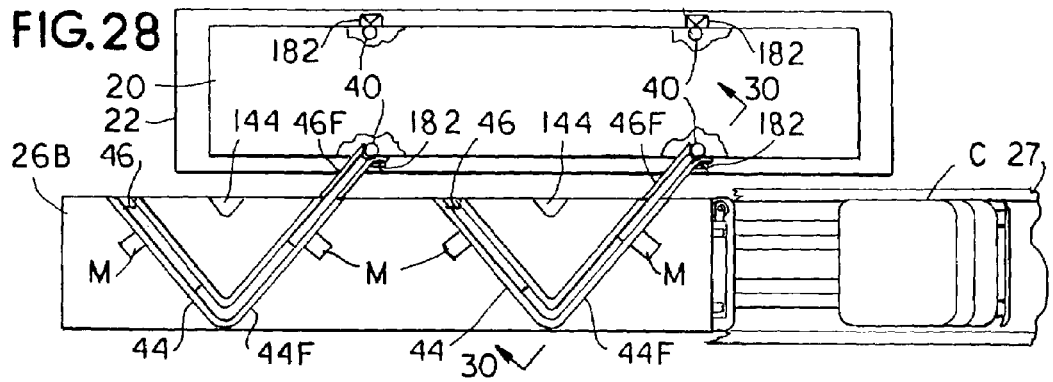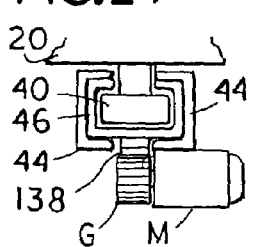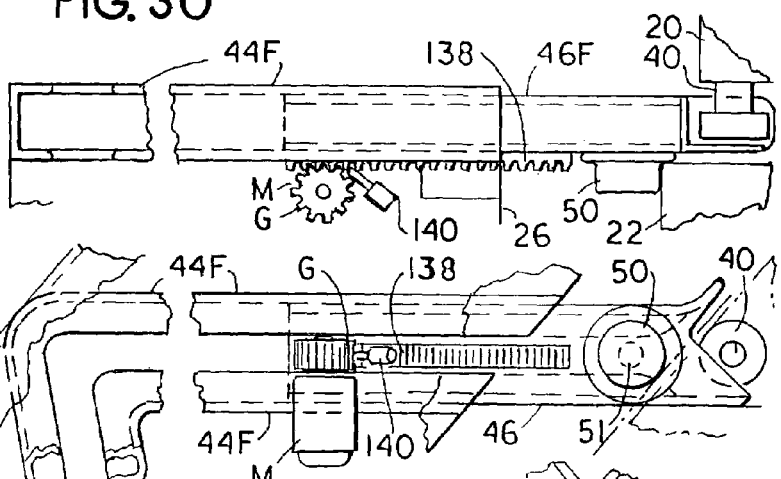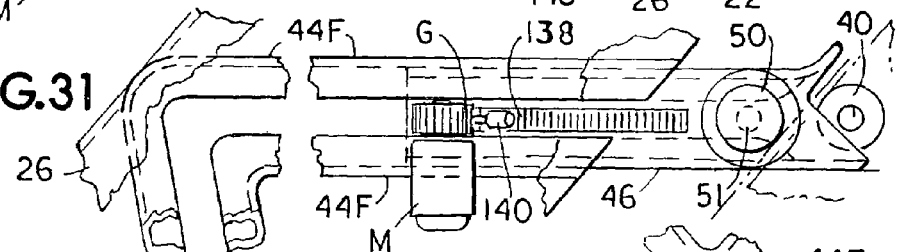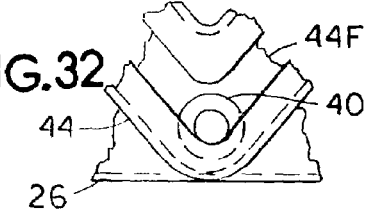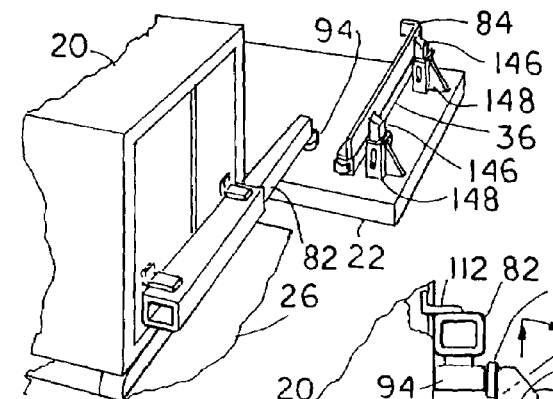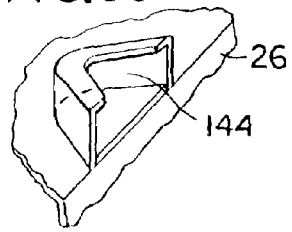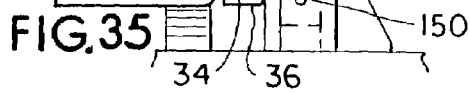

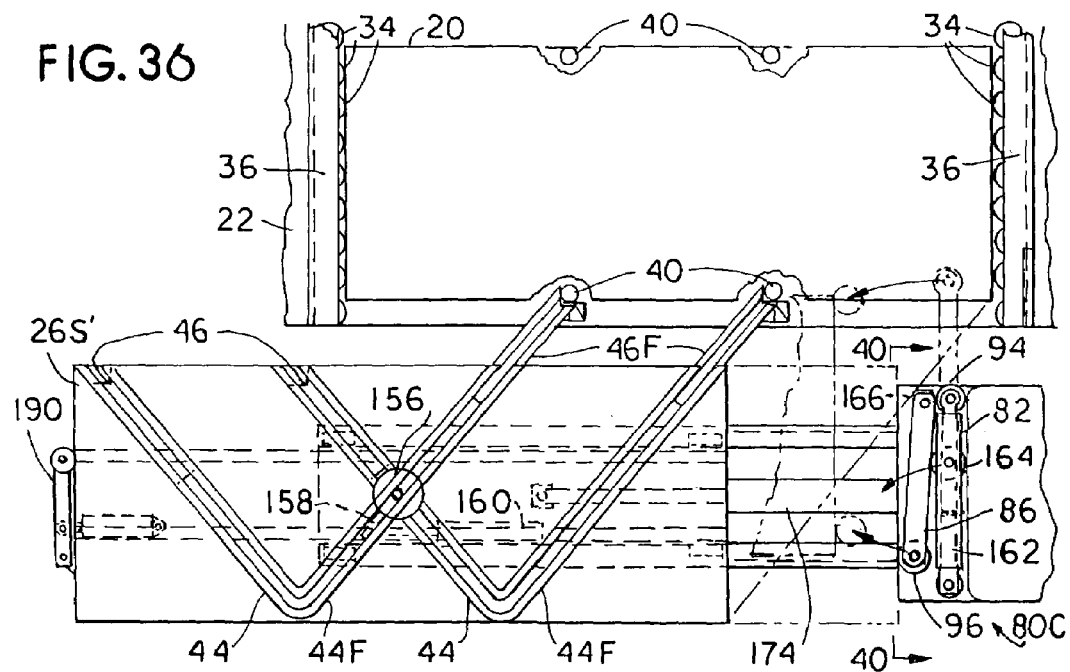
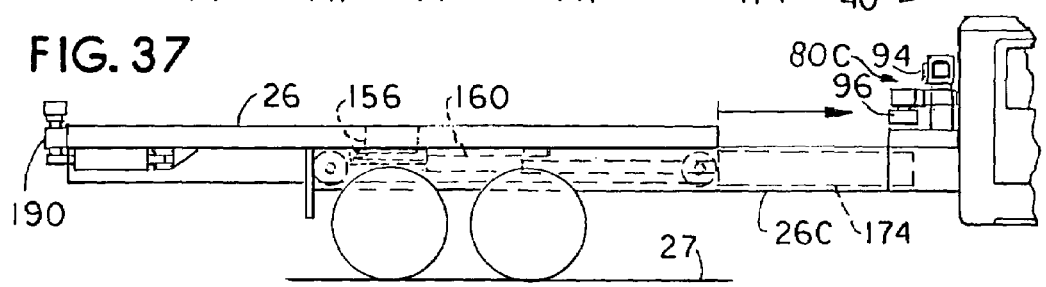
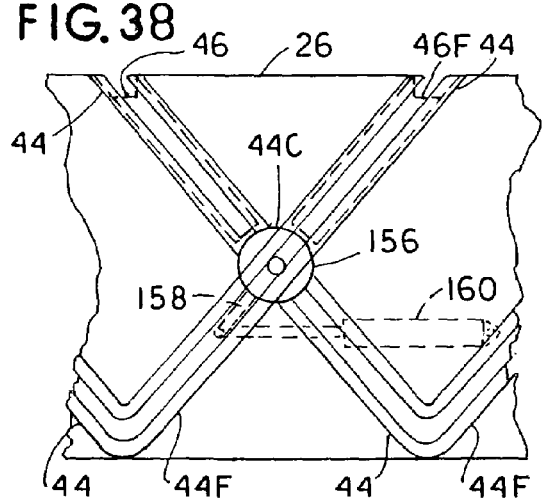
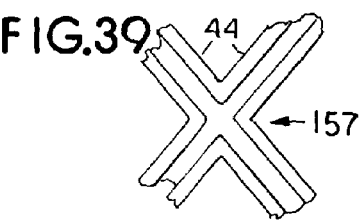
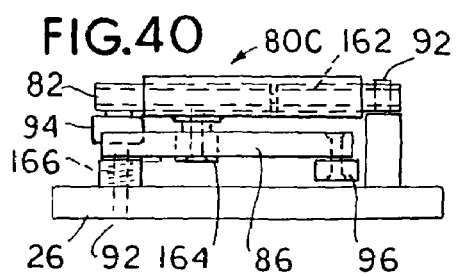

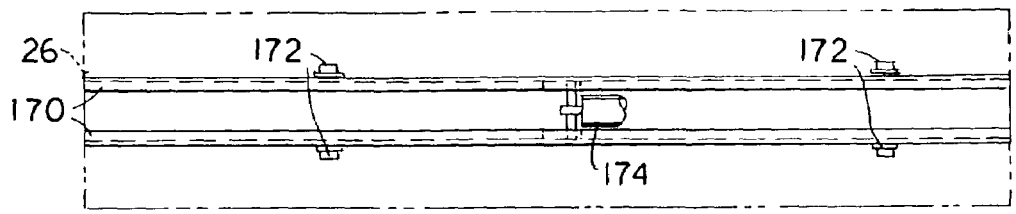
FIG. 41
FIG. 42
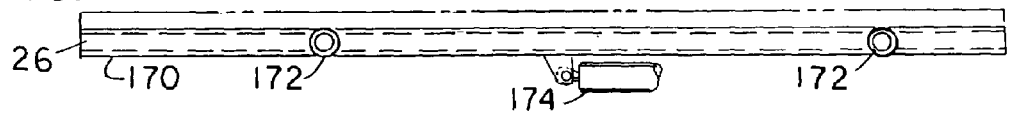
FIG. 43
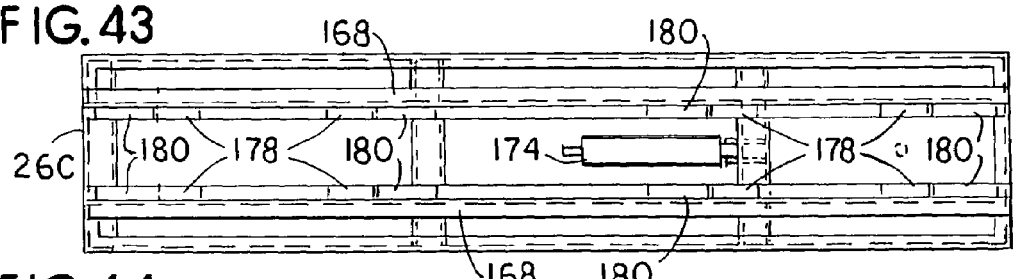
FIG. 44
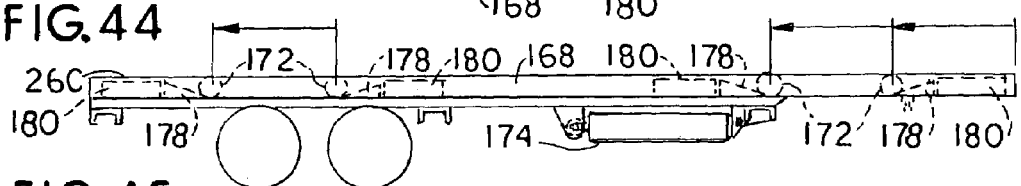
FIG. 45
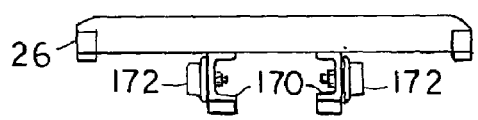
FIG. 46
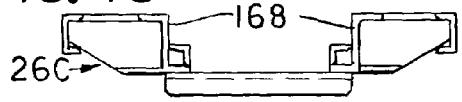
FIG. 47
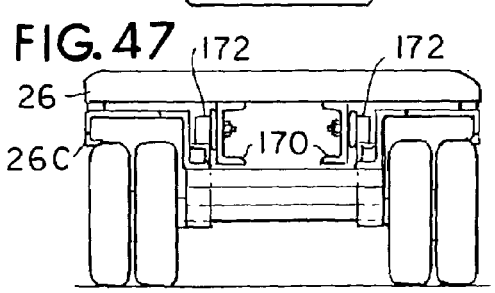
FIG. 48
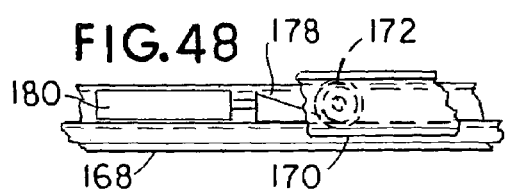
FIG. 49
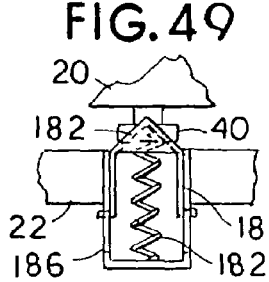
FIG. 50
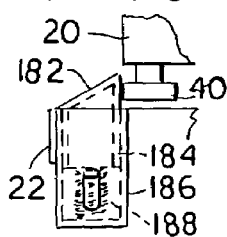

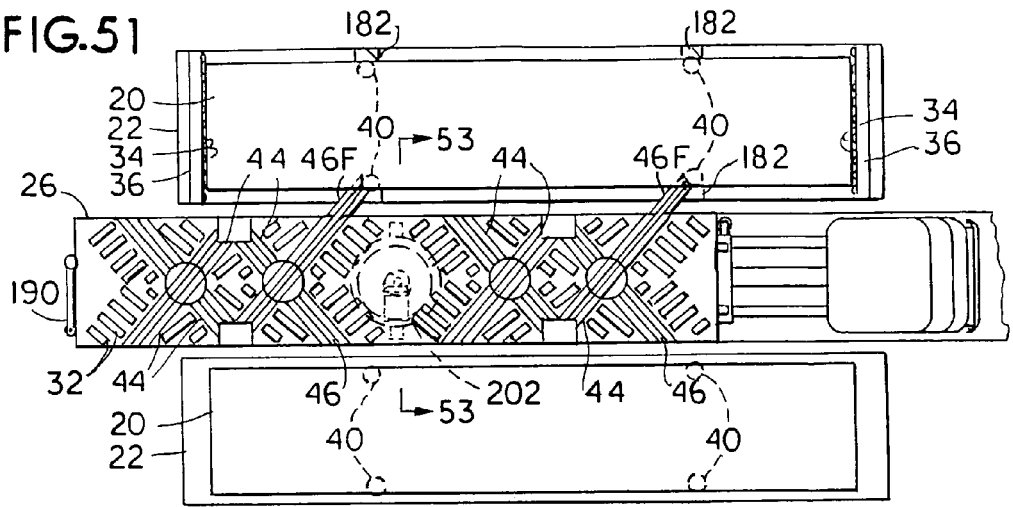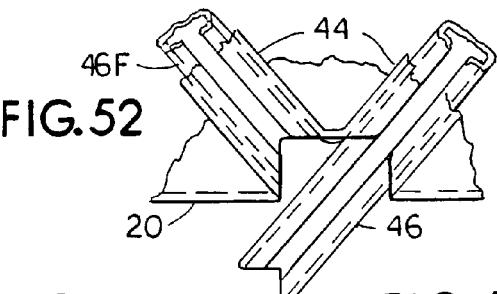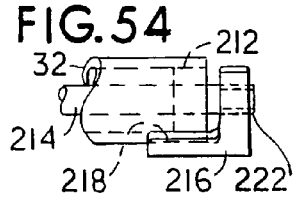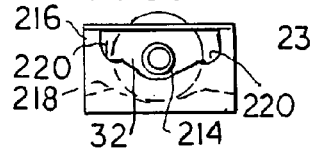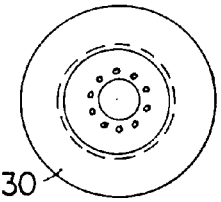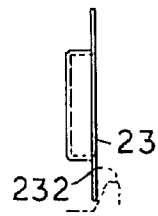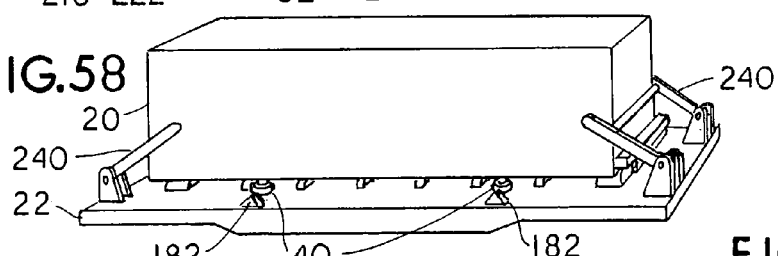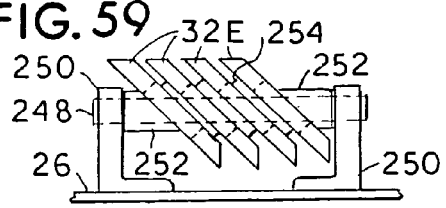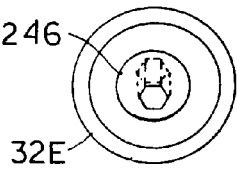

CONTAINER DRIVE-BY TRANSFER AND SYSTEM

CROSS REFERENCE TO RELATED PATENTS

This application corresponds to my U.S. Provisional Applications No. 60/369,195, filed Apr. 1, 2002; and No. 60/434,630, filed Dec. 18, 2002, and includes further improvements. This invention also relates to my U.S. patent applications Ser. No. 09/962,621, filed Aug. 31, 2000; Ser. No. 09/913,145, filed May 9, 2001, now U.S. Pat. No. 6,652,214; and Ser. No. 09/953,987, filed Sep. 17, 2001, now U.S. Pat. No. 6,695,561.

This invention improves the oblique transfer channels and roller arms of FIGS. 1 and 6 of my pending application by adding hinged channel extensions that fold the roller arms and keep the transfer rollers therein even when folded into pocket sides of the truck or trailer. This improvement includes a horizontal swing extension on each end of the transfer channel that keeps the transfer rollers in the channels during the truck haul and can secure the container on the truck.

In the earlier application rollers engaged by channels for transfer were pushed along in the channels across a trailer bed, FIGS. 1 and 6, and ended up extending out beyond the end of the channels on the side opposite from transfer, requiring extra rollers and channels to continue guidance of the container and requiring the removal or pushing in of the extended rollers before the truck could be driven on a highway. This can now be controlled from the truck cab to both retract and extend the hinged sections of the channels with the rollers therein. It is an object to have the channel and the transfer arm whose roller is therein horizontally pivot on preferably one axis when the container is fully in place on the truck so that the folding of the channel will also fold the arm thereon for clearance for truck travel and the extension of the channel will extend the transfer arm for transfer.

It is an object to provide a lower cost and simpler container roll or skid on-off drive-by container transfer between a highway truck and a standing railway car, dock or conveyor.

It is an object to provide lightweight preferably clip-on brackets for cam rollers and transfer arms that can be added to the bottom on either side of a standard cargo container for transfer between a standing railway car or dock and a highway vehicle. It is a further object to use existing ISO containers and detachably mount the roller arm brackets thereon without modifying the container.

It is an object to reduce the number of cam rollers and eliminate channels 46C, 46P and 46P' in FIGS. 1 and 6 in my pending application.

It is an object to engage a shorter transfer arm having a roller extended out from the container but not out beyond the side of the railway car so the rollers can be left extended for train travel.

It is an object to provide positioning markings for where the arms are to be fastened to the container and clear ways on both the railway cars and vehicles so any arms not used for a transfer can be moved across the platform of the car and align with the channels. It is an object to align the transfer arms on opposite sides of the container with the oblique channels and extend the far side arms with a tab when the container is pulled off so that arms can be left on, either swung out or in on both sides of the car.

As a variation it is an object to have two or more transfer rollers spaced apart on one transfer arm to track in one channel to align with only one channel especially for short containers and further to optionally provide one or more runners or bars secured obliquely across the bottom of the container to engage in the channels to guide the container for transfer.

It is an object to enable all transfers to be made driving forward, especially trailers, to keep in alignment easier.

It is an object to enable transfer to and from either side of the truck being driven forward.

It is an object to provide sliding or rolling adjustment of the bed on the truck or trailer chassis to open space for a container to enter from the front and clear the truck cab, and after transfer move the bed forward to shorten the truck length.

It is an object to provide height adjustment for the truck and trailer bed, and further fore and aft and side tilt to better align for transfer in situations or locations not leveled.

It is an object to provide latches to hold the container from rolling or sliding off the side of the dock or car to be released by the oblique channel arms engaging the transfer rollers or slides and releasing the latches simultaneously.

It is an object to provide inline extending or telescoping oblique transfer channel ends that gage against an adjacent platform with roller or slide to support the vehicle from tipping during side transfer. It is a further object to back stop the extended channel to further hold the vehicle from tipping toward the platform and vice-versa and provide release of the back stop (ratchet) for pulling in the channel extension for road clearance after transfer of the container.

It is an object to provide transverse channels on the dock or railway car to engage the transfer rollers to align the container to travel straight on and off the platform to eliminate need for end curb rollers or rails.

It is an object to provide devices to hold the container in place obvious on the vehicle traveling by.

With this, truck drivers can load and unload train cars and save truck hauls to distant hub centers. It also can find use as a toy.

These, other and further objects and features should be evident to those skilled in the art by study of this application with reference to the drawings wherein:

FIG. 1 is a plan view of a transfer station including a railway car, platform, or conveyor with transport container alongside of which a truck or vehicle bed is shown with oblique channels extended aligned for transfer of the container to the truck.

FIG. 2 is a partial plan view of FIG. 1 after transfer.

FIG. 3 is a plan view of the transfer arm on the container, the arm being extended and engaging a transfer channel on the truck bed, to larger scale.

FIG. 4 is a partial side elevation of FIG. 3.

FIG. 5 is an end elevational taken on line 5—5 of FIG. 3.

FIG. 6 is a plan view of the trailing end of a transfer channel on the truck bed.

FIG. 7 is a side view of FIG. 6.

FIG. 8 is a plan view of the station of FIG. 1 with the truck positioned and engaged to transfer the container to the railway car or dock.

FIG. 9 is this plan view during this transfer.

FIG. 10 is a transverse sectional elevation on line 10—10 of FIG. 8 to larger scale.

FIG. 11 is an elevation view on line 11—11 of FIG. 10.

FIGS. 12 and 13 are respectively plan and front elevation views of a variation of the push arms extended from the bed to the platform.

FIGS. 14 and 15 are respectively plan and front elevation views of another variation of push arms extended and pushing the container from the bed.

FIG. 16 is a plan view of a variation for a short container.

FIG. 17 is a front elevation on line 17—17 of FIG. 16 showing the push arm on the container with operating lever on the truck.

FIG. 18 is an end view taken on line 18—18 of FIG. 16 showing skid type clamp-on oblique alignment bars connecting the roller arm pivots on the container to guide in the oblique channels.

FIGS. 19 and 20 are successive plan views of a transfer arm being engaged by a channel to show how the channel can turn the arm out when folded in.

FIGS. 21 and 22 are respectively plan and end sectional views of a channel engaging a roller on a bracket mounted on a container.

FIG. 23 is an end cross section view of an open bottom oblique channel with runner on container taken on line 23—23 of FIG. 16.

FIG. 24 is a plan view of a double-sided transfer station.

FIG. 25 is a side elevation taken on line 25—25 of FIG. 24.

FIG. 26 is a plan view of a variation of wide-mouth channel engaging a container of FIG. 24.

FIG. 27 is a cross section elevation of an oblique flat across the bottom of a container taken on line 27—27 of FIG. 24.

FIG. 28 is a plan view of a truck ready to drive forward past a railway car to receive the container therefrom.

FIG. 29 is a vertical section through the oblique channel taken on line 29—29 of FIG. 28 to larger scale.

FIG. 30 is a broken side view of the channel taken on line 30—30 of FIG. 28.

FIG. 31 is a bottom view of FIG. 30.

FIG. 32 is a plan view of the bend in the channel.

FIG. 33 is a perspective view of a far-side roller pocket.

FIG. 34 is a perspective view of a push bar on a container aligned to engage the platform.

FIG. 35 is an end view of the push bar of FIG. 34 attached to the container, FIG. 34.

FIG. 36 is a partial plan view of a truck with its bed pushed back on the chassis to transfer the container on the platform to the bed by driving forward with clearance past the truck cab.

FIG. 37 is a side elevation of the truck of FIG. 36.

FIG. 38 is a plan view of a portion of FIG. 36 to larger scale to show channels crossing with a rotary switch.

FIG. 39 is a plan view of a channel crossing optional to the rotary switch of FIG. 38.

FIG. 40 is an end elevation on line 40—40 of FIG. 36 of the preferred push off arm device.

FIGS. 41 and 42 are respectively plan and side views of the under frame of a trailer bed.

FIGS. 43 and 44 are respectively plan and side views of the trailer chassis less the bed, FIGS. 41 and 42.

FIGS. 45, 46, and 47 are rear views of respectively the trailer bed, chassis, and bed on chassis.

FIG. 48 is a partial side view of the bed on chassis, lifted on rollers on incline wedges.

FIGS. 49 and 50 are side and end views of a latch for the platform to release the container with the extended channel.

FIG. 51 is a plan view of a truck with oblique channel bed to transfer containers to and from either side when driven forward.

FIG. 52 is an enlarged plan view at a meeting of the oblique channels in FIG. 51 with one extended.

FIG. 53 is a sectional elevation of a stabilizing flywheel on lines 53—53 of FIG. 51.

FIG. 54 is a partial side elevation of a container support roller.

FIG. 55 is an end view of FIG. 54.

FIGS. 56 and 57 are front and edge views of a tire protector for the truck trailers.

FIG. 58 is a perspective view of a container secured by end clamps to the railway car.

FIG. 59 is a side view of edge rollers and support.

FIG. 60 is an end view of the rollers of FIG. 59.

FIG. 61 is a face view of a roller of FIG. 60 in the direction of arrow 61 in FIG. 59.

Referring to the drawings and in particular to FIGS. 1–11, transport container (standard ISO) 20 is on platform 22, a railway car, dock or conveyor, standing alongside a vehicle way 24 on which a truck or trailer bed 26 is driven parallel and preferably guided alongside of and parallel to the platform 22 to transfer the container to or from the truck bed depending on the direction of movement of the bed parallel the side of the platform facing the vehicle way.

The platform is as in my pending application with berth 30 supporting container 20 on rollers or skids 32. Curb rollers 34 are mounted in line in channels 36 secured spaced above the platform at each end of the berth straight back from the transfer edge to longitudinally guide the container on and off. Suitable retractable positioning stops or recessing twist locks 37 for engaging the corner castings on the container are to be used if platform 22 is to be on a transport vehicle.

The container has arms 38 each on a bracket 39 added along one side for transfer. Each arm 38 has a roller 40 on pin 42 depending from the outer end of the arm. Each arm is mounted on a pivot pin 43 depending from bracket 39 to turn under and out from under the side edge of the container to position rollers 40 to engage in channels 44 run obliquely across the truck bed.

The bed has two channels 44 turned legs up running obliquely parallel across it. Each channel has an engaging section 46 with tongue 47, a central section 44 secured to the bed, and a near side or extended travel section 48. End channel sections 46 and 48 are mounted on pivots 49 to turn horizontally out from over the bed to align with the central channel 44 for rollers 40 on the container to guide in for transfer. Outer ends of channel sections 46 are cut to be when extended approximately at right angles to the transfer side of the bed and platform and are spaced to engage outer rollers 40 on extended arms 38 simultaneously when the bed is moved to the left (truck is backed up) keeping the sides of the container parallel with the facing side of the platform during transfer. A gaging roller 50 is mounted on a pin 51 depending from each channel 46 to engage the side of the platform to keep the end of the channel in line to engage a roller 40 and help keep the spacing between the platform and bed during transfer. If the spacing between the platform and bed is reduced, roller 50 on channel 46 will lessen its angle to align for roller 40. With only one roller 40 tracking in each channel 44 this reduction of the oblique angle should not be critical. Tongue 47 on channel 46 helps gather roller 40 into the channel and later push the roller out to position the container on the platform. The trailing channels 48 guide rollers 40 when extended beyond the, bed and fold arms in under the container after transfer to the bed when the channels are retracted.

For convenience, all swivel channels 46 and 48 on the bed are linked to operate together, FIGS. 3–4 and 6–7. Double acting air cylinders 58 are pivotally connected between bed 26 and channels 46 and 48 and controlled by a spring centered three-position air valve 60 connecting air and exhaust to either opposite ends of the cylinder by the direction the operator turns valve 60. Valve 60 normally connects both ends of the cylinders together. Valve 60 is operated by the driver to extend or retract all channels 46 and 48 together and returns to center leaving the channels as set until reset or the channels are turned by rollers 40 during transfer. All cylinders 58 operate in parallel as indicated by arrows in FIGS. 3 and 7 to connect them. Ball and dents 64 hold the channels 46 and 48 in end positions against stops 65 such as the ends of travel of cylinder 60 or pins or tabs on the bed.

Referring to FIGS. 3–5 for the preferred clip-on transfer arm 38, its mounting bracket 39 is a locating latch plate to engage the bottom of the container side rail channel 70 and catch over the side corner and has one or more spring loops 72 integral with the plate extending back and around and up to clamp around and over the bottom leg of side rail 70 of the container. Pivot pin 43 is secured depending from bracket 39 to support arm 38 and serves as pivot for the arm and for a second roller 40 where used. Stop pin 74 depending from bracket 38 engages into recess 75 in arm 38 to limit the angle the arm turns to align with channel 44 and travel therein. The angle shown is 45°. Ball and dents 64 stop the arm from swinging out of place during transfer and transport.

With rollers 40 kept in channels 44 for the full transfer onto the truck, one arm 38 with only the end roller 40 for each of the two channels 44 is needed. With these arms on only one side of the container the angle of the channel extensions 46 can then vary with the distance between the platform and parallel vehicle bed within limits.

Referring to FIGS. 1, 8 and 9, on the platform 22 each arm 38 has a stop 78 against which it can be swung parallel under the container. When the container is started to be pulled from the platform, any arm 38 not extended on the far side is extended by engaging the stop 78 which turns it clockwise to align its roller or rollers to enter channel 46 before the far side of the container is brought to be over the channel. Thus it does not matter if there is any arm 38 on the far side or if an arm 38 is extended or retracted on that side. Curb rollers 34 mounted in channels 36 are mounted above the platform to extend to its edge and leave space so channels 46 can sweep under them.

Referring to FIGS. 1 and 8–11, the bed has a push-off starter device 80 that has an arm 82 extended to engage a tab 84 at the right end of the berth and an arm 86 of equal length extending to push the forward end of the container back on the truck bed so the container is pushed parallel along channels in line with its berth on the platform until engaged between curb rollers 34 at the ends of the berth when these continue the transfer. Each arm 82 and 86 is separately secured to a spur gear 90 mounted concentric to turn in mesh on adjacent vertical shafts 92 secured to bed 26. Arms 82 and 86 rotate equally and oppositely. Arm 82 is pushed counterclockwise by the truck moving it against tab 84, while arm 86 is thereby moved clockwise to push the container back along channels 44. Rollers 94 and 96 are on the outer ends of arms 82 and 86 respectively to roll on tab 84 and container 20. Arm 82 is telescoping extending through a sleeve 98 that is secured on top of its gear 90 to extend out to a stop and push in for truck clearance.

The push-on arm of my pending application is not needed with the correct loading speed, but can be added if needed.

Operation

To load the truck, the truck facing to the right is stopped with its bed alongside the container on platform 22 as shown in FIG. 1 just beyond (to the right of) alignment. Push arm 82 is not extended. The truck is backed up in alignment so channels 46 catch rollers 40 and pull the container straight from the platform onto the bed 26 until the container leaves the curb rollers 34 at the left pushing the container off of the dock nearly completely onto the bed and all the way with a little momentum. Channels 46 and 48 are rotated counterclockwise by the operator pressuring cylinders 58 to retract. The channels turn arms 38 in under the container to clear the sides of the bed ready to be secured to drive away.

Referring to FIGS. 8 and 9, to unload the container from the truck, the truck is positioned in the same direction as for loading but to the left of (before) alignment, FIG. 8. Push arm 82 is fully extended and channels 44 and 48 are extended or will be extended during transfer as in FIG. 8, turning arms 38 out to align wheels 40 to travel channels 44. The truck is driven forward (to the right), engaging arm 82 against tab 84. Arm 82 drives arm 86 equally and oppositely as shown by arrows in FIG. 9. Arm 82 pushes its roller 94 against tab 84 and arm 86's roller 96 is pushed against the container in line with rollers 34 at the right pushing the container out parallel onto the platform until after its ends align between end curb rollers 34. From there the truck pushes the container against the curb rollers 34 at the right while it is pushed straight onto the platform by channels 46 pushing on rollers 40 to direct it fully into place as in FIG. 1. Channels 46 and 48 on the truck bed are retracted and arm 82 pushed in before the truck is driven away. Locking pins are lifted to engage corner castings on the container or it is otherwise secured in place for transport, FIG. 5B.

Variations—Have Suffix Added

FIGS. 12 and 13 show a variation of the push arms 82 and 86. Bed 26 has a vertical pivot post 92A supporting two facing beveled gears 90A connected by one or more pinions 100 on cross shafting 102 through the post to turn the beveled gears 90A oppositely. Arm 82A is secured extending radially from one gear 90A to engage its roller 94 onto tab 84, and arm 86A is secured radially from the other gear 90A to engage its roller 96 against the end of the container. Arm 82A turns arm 86A in line with the curb rollers 34 to push the container to enter between curb channels 36 for continuing transfer as described.

Referring to FIGS. 14 and 15 for push arms 82B and 86B operated in parallel by chain and sprockets 110 or beveled gearing and shafting connecting them each on a separate pivot post 92B to rotate in parallel. When bottom arm 82B pushes its roller 94 against tab 84, top arm 86 swings back in line to push the container with its wheel 96 to enter the platform aligned between curb channels 36.

Referring to FIGS. 16 and 17, the push-off arm 80C can be detachably mounted on either end of container 20. Arm 80C has a rectangular tube 82 telescoping in tube 98C and end roller 94 for engaging plate 84. Tube 98C has clips 112 to suspend it is holes or over brackets 114 added on the ends of container 20 to support the arm 80C on the forward end on the truck or trailer so the arm can be extended to align to engage plate 84 when the vehicle is driven forward to push the container back on the bed parallel along the oblique channels 44 and in line straight onto the platform.

Referring to FIGS. 16 and 18, platform 22S and bed 26S are as shown in FIGS. 1, 8, and 9 except shortened for a short container 20S where one channel run 46, 44, 48 will suffice with one or more extra rollers 40 added to the container spaced to accurately align in the channel run, or a flat bar or tee section 116 connects pivot pins 43 on the oblique angle between opposite edges of the container to track and guide in channels 46 and 44 to keep the container parallel in alignment during transfer.

Container 20S has oblique runners 120 secured parallel to channel 44 from side to end of the containers to help support the container. Runners 120 are square tubes with low friction wear strips secured on the bottom.

Referring to FIGS. 19 and 20 where channel. 46, moving to the left as indicated by arrow, is engaging a roller 40 that turns its arm 38 from parallel to the container, FIG. 19, out to the oblique angle for entering channel 46, FIG. 20.

Referring to FIGS. 21 and 22 where channel 46 is engaging a roller 40 to pull it into the channel. The roller is mounted on a bracket 39D under the side of the container. This is a useful variation where channel 46 can reach under the container to engage it and eliminate arms 38 and channels 48, the need to extend and retract them, and run channel 44 to the right edge of the bed.

Referring to FIG. 23 for a variation of channels 44, 46 and 48 which have an open bottom and Z-bar sides which form a track for rollers 40. The top legs of the Z-bars are turned in over roller 40 to hold it from jumping up from the track and an open bottom to shed dirt and snow. Cross ties 128 connect the Z-bars and serve to mount above bed 26.

Referring to FIGS. 24 and 25 for an arrangement to load and unload from both sides of trailer 26L, end channels 48 are replaced by end channels 46 so truck 26L moved forward to discharge the container 20 to the platform 22 on the left side of the trailer and moves forward to take on the container on the right side, which is easier than backing up the trailer. Trailer 26L is of extended length to clear the truck cab for front end transfer of the container. Push arms 82 and 86 are directed forward so rollers 94 and 96 clear space for the oncoming container, FIG. 24. After this container is transferred, channels 46 are all folded in with rollers 40 therein folding arms 38 in under the container to hold it and clear for transport.

Channels 44 and 46 when extended run across bed 26L in one oblique direction preferably forward to the right. With rollers 40 on both sides of the container, these channels can transfer the container on from the right and off from the driver's side of bed 26L driven forward to the right. The bed can be plastic covered oblique support members 130 parallel channels 44 to reduce friction for the container to slide on and off this bed which can replace the transverse floor supports and floor of the truck or trailer. For transfer of a container from the trailer, arms 82 and 86 are turned to be in line at right angles to the bed to engage roller 94 with tab 84 to push the container out for transfer onto the platform on the left.

Channel 46 can have a wide mouth as in FIG. 26 to engage a roller 40 or flat 116 over a range of spacing between the platform 22 and bed 26.

Referring to FIGS. 24 and 27, the bottom of the container at the left, FIG. 24, has an inverted tee or flat runner 116 secured obliquely across the bottom of the container to protect rollers 40 if set on the ground or pavement. The runners are of width to guide and slide in the channels 44 and 46. The runners are offset from the bottom of the container by spacers so top lips on these channels overlap top edges of the flats. The spacers can be rollers 40 which ride in the gap between facing edges of channels 44 and 46.

Referring to FIGS. 28–33 for a variation of the tractor-trailer that has forward loading and unloading from one side. The bed 26B slides or rolls back on its chassis 26C to provide room for the container to clear cab C to be received from the front while driving forward. The bed would thereafter be moved forward to reduce the truck length for highway operation. The railway car or dock 22 is as described. Container 20 has rollers 40 arranged in a rectangular formation equally distanced from each end.

Trailer 26B has two sets of reversed oblique angled channels 44F and 44R which meet on the right side of the bed 26B for rollers 40 on the near side of the container to travel in on channels 44F and out on channels 44. The channels 44F and 44 of each set are connected with a curve, FIGS. 31 and 32, for rollers 40 to travel. Channels 46F and 46 telescope in channels 44F and 44 respectively to extend out the left side of the bed to engage the two rollers 40 under the near side of container 20', thus eliminating arms 38. Channels 46F and 46 respectively nest in between two facing channels 44F and two 44 spaced apart for the necks of rollers 40 to guide between their facing leg ends.

Channels 46F and 46 are the mirror image of each other and are extended by an air cylinder or motor M driving gear G engaged with a gear rack 138 central along the bottom of each extending channel to extend and retract it. Rack 138 and pawl 140, FIGS. 29–31, hold each channel 46F or 46R extended against platform 22. Flanged wheel 50 on the bottom of these channels 46F and 46 rolls on the side edge of the platform to gage the scoop end of the channel to align to engage roller 40. Pawl 140 is released by air cylinder before motor M can retract the channel. Rollers 50 keep bed 26B and/or platform 26 from tipping toward each other during transfer. Rollers 40 under the far side of the container enter and leave pockets 144, FIGS. 28 and 33, on the far side of the trailer and enter and leave at the oblique angles changing direction 80°, at which angle the pocket widens out.

Referring to FIGS. 34 and 35, plate 84 is mounted on vertical tubes or bars 146 which slide up in tubes 148 spaced apart and secured to the platform 22 to remove or swing the plate 84 away so the push arm 82 can be removed from the container when on the platform. A pin 150 through each bar 146 slides up in slot 152 in tube 148 until the bars with plate 84 can be tipped away as shown in FIG. 35. Then push arm 82 can be tilted up to remove it from the container.

Referring to FIGS. 36–39, if the truck or trailer bed is short for a short container the two sets of channels each comprising a channel 44F and 44 that meet forming a crossing using either a turntable 156, FIGS. 36 and 38 or a crossing 157, FIG. 39. The turntable 156 is mounted to rotate on bed 26S' and has a section of channel track 44C which is turned to align either channel 44F or 44 by lever arm 158 extending from the turntable and air cylinder 160 pivotally connected between the bed and the lever and actuated to align to pass roller 40.

Referring to FIGS. 36 and 40, the single-roller-tooth container push-out starter 80C is less apt to bind than gears 90. One of two vertical pivot posts 92 secured to and spaced apart on the bed has a telescoping arm 82 with an air cylinder 162 therein to retract and extend out to engage its roller 94 against plate 84 on the dock or car 22. Arm 86 with its push roller 96 extends horizontally below arm 82 to rotate on a shorter post 92. Arm 82 has a roller 154 mounted on a depending pin positioned to engage and roll on the front facing side of arm 86 to push it back around its post when arm 82 is rotated when its roller 94 is engaged against plate 84 by the forward movement of the truck. Rollers 94 and 96 then swing back aligned to move the container back and out from bed 26 onto the berth aligned for continuing transfer with channels 44 and 46, pushing rollers 40 out as the truck moves forward. Arms 82 and 86 are each optionally returned by a spring 164 to transverse position after each use, FIG. 36, and secured for highway travel.

Referring to FIGS. 41–48 for details of the trailer's chassis and its push-back bed. The chassis 26C has the usual frame with lengthwise channels or I-beams 168 with legs that face in forming a track for the bed having similar parallel channel rails 170 spaced between beams 168 with legs facing in and rollers 172 on pins secured extended out and spaced apart along the outer sides of the webs of channels 170 to run on and between the in-facing bottom legs of the chassis beams 168, which are connected below them so the bed is free to be rolled back and forth between and along the truck frame channels. An air cylinder 174 is pivotally connected between frames 26 and 26C to extend and retract and limit movement of the bed relative to the trailer frame to clear an incoming container from the truck cab.

As a preferred feature the truck frame rails could be Z-shaped structural members turned upper legs out and bottom legs in to support rollers 172 and have lift ramps or wedges 178 on the bottom legs spaced for rollers to be run up to lift the platform as an adjustment for transfer height. Ramps 178 can be of fixed slope and location or individually lifted and lowered or moved by hydraulic cylinders 180 each connected to a wedge to slide on the bottom leg of frame 26C to lift a roller 172 to tilt the bed up fore or aft and side to side to further adjust for transfer to correct misalignments between vehicle and docks heights and tilts. The truck cab can be a half cab to give added clearance for transfer of a container from the front on side opposite to the cab.

The railway car and docks have latches 182, shown in FIGS. 49 and 50, along the sides where transfers take place to block rollers 40 on that side from movement out but are recessed by rollers 40 on a container entering the platform. The preferred latches have a vertically recessing rectangular tube with top which tapers down from the back to the transfer side and ends which the extended scoop end of the transfer channel 46 engages to press down when the channel engaged a roller 40. Latches 182 stop rollers 40 from exiting the car or dock until released by a channel 46. There is preferably one latch between each spot for a roller 40 and the edge of the car or dock. Their square tube 184 is mounted to slide up and down in a square tube 186 secured vertically and flush in platform 22. Tube 184 is extended above bed 26 by spring 188 inside the tubes to recess tube 184 flush with the bed. These latches are recessed by the rollers 40 on an oncoming container but stop the container from sliding or rolling off the far side of the car.

The truck bed could have crossing oblique channels as in FIG. 51 so the truck can be driven forward to both load and unload and further do that from either side of the truck. This type of bed can be generally applied as to the bed frame of FIG. 41 and has oblique channels 44 that extend from side to side on the truck bed or frame 26 and have telescoping channel ends 46, FIG. 52, to receive the container from the front or back on either side and deliver the container out the back or front on either side so that the truck can be driven forward to take on or put off the container on either side and if needed while backing up.

Referring to FIGS. 51 and 52, meeting channels 26 when recessed can pass roller 40 between them. Either can be extended at a time for a transfer. Channels 26 have open ends for roller 40 to travel into or out from the channel on the oblique angles.

Operation

To receive a container from a standing railway car or platform 22, truck 26 is driven parallel alongside of the platform as in FIG. 51. To receive the container on the left side of the truck, channels 46 are extended facing forward on that side each behind a roller 40. Rollers 50 gage the distance the channels extend to align behind rollers 40. The truck is driven forward to release latches 182 and scoop in rollers 40, pulling them with the container straight off the platform and at the oblique angle parallelly onto the truck bed. The curb rollers or equal at the front of the platform force the container out when the container is forced forward against them. When the container leaves the curb rollers, with the gap between the platform and bed left to go, momentum should carry the container the rest of the way onto the truck and probably overshoot after rollers 40 on the opposite side of the container enter channels 46 of the off-going set of channels. A push arm 190 at the rear, as in my pending patent application Ser. No. 09/953,987, is engaged at the rear and swung back by the oncoming container dissipating the energy in its operating air cylinder and air storage and bleed and reverses the container's travel to push it back into position on the bed where arm 190 is stopped by the frame of the bed from pushing the container too far. A similar push arm at the front of the bed could serve to push a container that stops short of its position on the bed, or the truck could be backed up for another try. Channels 46 are retracted and the container secured before driving further.

To unload, with the truck parallel the dock 22 ahead of alignment, channels 46 are extended on the side facing the empty dock. Arm 82 is extended on that side for roller 94 to engage the forward plate 84. The truck is driven forward. Roller 94 engages plate 84 pushing the container back and out parallel along the oblique channels and against forward end curb rollers on the dock which push the container until rollers 40 leave extended channels 46 when the container is in place on the dock behind latches 182. Channels 46 are retracted and the truck driven away.

Referring to FIGS. 51 and 53, the trailer or truck bed can be stabilized from tipping by a gyroscope flywheel 200 secured on vertical shaft 201 in housing 202 mounted on trunnions 204 on a transverse axis to the bottom of the trailer or truck to tip fore and aft but not sideways. The flywheel is driven by electric motor 206 through beveled gearing 207. Motor 206 is mounted on housing 202 and connected by cord to local power or to a generator or battery on the truck to stabilize the trailer or truck during transfer only. The motor could be plugged in to local power to rev up the flywheel before container transfer while the truck is stationary and unplugged before transfer while the truck is stationary.

Referring to FIG. 51 support rollers 32 are mounted some in each of two directions at right angles to the two directions of channels 44 to move the container in either direction along the channels shown 80° apart. Rollers 32 for each direction of channels 44 are preferably lifted for the container to roll on them without chafing on the rollers out of this line of transfer. They could be lifted by airbags each under a set or frame of rollers 32 and the sets of rollers of one direction connected to air separate from the rollers 32 of the other line of travel.

Rollers 32, mounted as in FIGS. 54 and 55, are lifted when rolled by a container. These rollers have a steel tube with or without a bearing 212 in each end on a round shaft 214 which extends from each end into a frame or pillow block 216. Each pillow block has a shallow trough 218 parallel to and supporting an end of the tube. The trough is tapered up at a small angle to lift the tube when rolled thereon. The shaft extends with clearance into a cam hole in the pillow block to have free movement until lifted into a bearing pocket or ledge 220 at each end of travel in the hole where the tube leaves the trough at either end of the upward slope of the trough to support the roller to turn free of the trough on its bearings until stopped. When the rollers stop with slight vibration they easily roll back down into the trough. The rollers so lifted are only those needed to roll the container in the direction for transfer. The container is then lifted above the rollers for the other line of travel to eliminate scuffing on them. Instead of a bearing in the end of the roller, a sleeve bearing 222 on the end of the shaft can let the shaft rotate in the sleeve in a pocket 220.

Referring to FIGS. 56 and 57 for a circular steel tire guard 230 mounted to the outside of the rear trailer wheels to engage with a steel curb rail 232 to shift the rear of the trailer sideways to align along the driveway for transferring especially if backing up. Guard 230 is stamped out of steel to bolt on the hub of the trailer and clears the road with tire correctly inflated.

Referring to FIG. 58, other locking devices for holding the container on the railway car should be used, preferably visible end yokes 240 each pivoted to lift and lower against and across an end of the container to secure it to the car when swung against the container. This can be air or hand lifted before transfer to clear the container, leaving the latches 182 to secure the container until depressed by channels 46 engaging rollers 40 for transfer of the container from the car.

Referring to FIGS. 59–61, preferably rollers 32E for the transfer side edge of the bed of truck or trailer 26 are skewed to the transfer angle to help guide the container across. Each roller 26E has a central bearing 246 with a hex hole run through it at the oblique angle (here shown as 45°) for hex shaft 248 mounted in end supports 250 secured to the bed 26. Several rollers 32E of conical section are stacked on shaft 248 and separated from the end supports by sleeves 252 and from each other by washers 254 of low friction material. The circumference of roller 32E is tapered at the oblique angle. They are stacked in line to align the taper at the top where they engage to support the container in passing on and off bed 26. These edge rollers are useful where the container is transferred on and off of the bed in one oblique line to reduce friction if needed. Container support members 130 can have plastic wear strips thereon to reduce friction as an alternative to rollers 32.

Having thus described my invention with some variations, I intend to cover by the claims all embodiments, variations, applications, uses, and parts which are within the true spirit and scope of this invention.

I claim as my invention:

1. A drive-by container transfer system comprising in combination:
    a transport container;
    a platform therefor having at least one substantially straight transfer side and conveying means for conveying said container at right angles straight to said side onto and off from said platform;
    a guideway driveway spaced parallel along said transfer side;
    a vehicle for operation along said driveway and having a bed for supporting said container with sides parallel said side; and
    oblique conveyor means on said bed and means thereon to engage said container when on said platform to transfer it obliquely on said bed and straight on said platform and guide said container parallelly between, to and from, said platform and said vehicle according to the direction of movement of said vehicle along said side of said platform, and recessable latches on said platform to block said container from movement off of the platform, said oblique conveyor means comprising channels recessing said latches to release said container to travel on said channels when said channels are swept along over the platform.

2. A system as in claim 1 and support rollers on said bed each having an axle for supporting each end, a shallow trough for supporting each roller on its diameter and lift the roller when rolled to lift the container, and end support means for supporting said axle to rotate when said roller is rolled up said trough thereinto, said roller then rolling clear of said trough.

3. A system as in claim 1, said vehicle being a motor vehicle having an operator's cab at the front, said bed being mounted to said motor vehicle to be moved back for transfer of said container onto the bed to clear the cab and retract for highway driving.

4. A system as in claim 1, and a first and a second vertical pivot shaft spaced apart mounted on said bed;
    a first and a second horizontal arm secured extending respectively from said first and second shaft to rotate horizontally thereon;
    a roller on the end of each arm mounted to rotate on a vertical axis,
    said first arm being extendable to engage its said roller with said platform to be rotated back with movement of said vehicle forward,
    a third roller on said first arm spaced to engage along a length of said second arm to rotate it backward when the vehicle is then driven forward to engage said second roller against the container to push it out from the vehicle.

5. A vehicle bed as in claim 1 having oblique support runners on said bed parallel to said channels for supporting said container.

6. A system as in claim 1 and a vertical tab on said platform said push-off mechanism having a first and second rotary arm each having a roller at one end and mechanical means connecting back from that end to rotate horizontally one the other together, one arm being extendable to engage said tab on said platform to rotate back when said truck is moved to push the arm against said tab, turning said second arm positioned to push said container out in alignment to transfer from said truck to said platform.

7. A system as in claim 1, said vehicle being a roadway motor vehicle.

8. A system as in claim 1, and end yokes each having pivotally mounted arms on said platform hinged to swing parallel along each side of said container and at least one crossmember connecting two in line to straddle the ends of the container to make obvious that the container is secured to the platform and that can be swung endward away from said container to release said container for transfer.

9. A side-by-side container move-by transfer system comprising in combination, a container, a platform therefor, an aligning driveway thereby, a vehicle thereon having a bed for said container, said bed having at least one fixed channel extending substantially across it at an acute angle for transfer of the container, and a continuing section of said channel pivotally mounted to each end to extend beyond each side of said bed in line with said fixed channel and fold in over the bed and out to the acute angle, spaced apart cam means on said container aligned to engage said channels when moving parallel along said way, said cam means pulling said container onto said bed while remaining in said channels and being folded over said bed when said continuing sections are folded in for highway clearance.

10. A system as in claim 9, said cam means including at least one clip-on bracket for mounting on said container and a cam roller mounted on said bracket for engaging in said channel.

11. A system as in claim 10, including a transfer arm pivotally mounted (hinged) to the bottom of said bracket to turn horizontally, at least one said roller being mounted thereon to engage in said channel and turn said arm with a said section of said channel.

12. A system as in claim 9, said cam means being at least one transfer arm, each having at least one cam roller, said arms being mounted to turn horizontally out to said angle to engage said rollers in and guide said container along said channels.

13. A system as in claim 9, said cam means being a flat secured obliquely across underneath said container to engage in said channel to guide said container parallel obliquely across said bed for transfer to and from said bed.

14. A vehicle bed as in claim 9 and support rollers supported across between said runners 90° thereto to support said container to roll on and off said bed.

15. A system as in claim 9, said truck having a chassis for supporting said bed, said bed having support rollers and said chassis tracks for said rollers along its length, and wedges on said tracks on said chassis to lift said rollers and lift said bed, and means for moving said wedges along said tracks to lift or lower said bed to height for transfer of said container.

16. A system as in claim 9, said arms pivot on the pivot axis of the channel extensions when in place on the bed so the channel extensions when folded fold in the arms to secure the container in place on the bed.

* * * * *